United States Patent
Schumann et al.

(10) Patent No.: US 6,253,894 B1
(45) Date of Patent: Jul. 3, 2001

(54) TWO-SIDE ADJUSTMENT DRIVE MECHANISM

(75) Inventors: Peter Schumann, Untersiemau; Michael Forkel, Coburg, both of (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/445,874

(22) PCT Filed: Jun. 6, 1998

(86) PCT No.: PCT/DE98/01596

§ 371 Date: Dec. 13, 1999

§ 102(e) Date: Dec. 13, 1999

(87) PCT Pub. No.: WO98/57819

PCT Pub. Date: Dec. 23, 1998

(30) Foreign Application Priority Data

Jun. 13, 1997 (DE) .............................................. 197 25 899

(51) Int. Cl.⁷ .................................................. F16D 67/02
(52) U.S. Cl. .............................................. 192/15; 297/367
(58) Field of Search .................................. 192/223.1, 15, 192/43.1; 74/143; 297/362, 367, 368

(56) References Cited

U.S. PATENT DOCUMENTS

| | | | |
|---|---|---|---|
| 2,746,331 | 5/1956 | Andersen | 81/58.1 |
| 2,995,226 | 8/1961 | Gilder | 192/8 |
| 3,008,765 | 11/1961 | Tischler et al. | 297/367 |
| 5,611,747 | 3/1997 | Bauer et al. | 475/162 |
| 5,692,589 * | 12/1997 | Beguin | 297/367 |
| 5,755,491 | 5/1998 | Baloche et al. | 297/362 |
| 5,794,479 | 8/1998 | Schwarzbich | 74/143 |
| 5,865,285 | 2/1999 | Minkenberg et al. | 192/15 |
| 5,881,854 | 3/1999 | Rougnon-Glasson | 192/15 |
| 5,918,714 * | 7/1999 | Kodereit | 192/15 |

FOREIGN PATENT DOCUMENTS

| | | |
|---|---|---|
| 39 14 056 | 8/1990 | (DE) . |
| 41 20 617 | 12/1992 | (DE) . |
| 44 37 073 | 1/1996 | (DE) . |
| 195 27 912 | 8/1996 | (DE) . |
| 195 18 424 | 11/1996 | (DE) . |
| 195 40 631 | 5/1997 | (DE) . |
| 197 02 123 | 10/1997 | (DE) . |
| 197 26 257 | 1/1998 | (DE) . |
| 196 53 722 | 7/1998 | (DE) . |
| 197 34 536 | 2/1999 | (DE) . |
| 0 450 324 | 10/1991 | (EP) . |
| 0 754 589 | 1/1997 | (EP) . |
| 05176819 | 7/1993 | (JP) . |

\* cited by examiner

*Primary Examiner*—Sherry Estremsky
(74) *Attorney, Agent, or Firm*—Christie, Parker & Hale, LLP

(57) ABSTRACT

A drive acting on both sides produces a rotary movement, more particularly a rotary movement for a manual height or incline adjustment of a vehicle seat. The drive lever is coupled to locking means which can be brought into engagement with teeth mounted on the circumference of a drive wheel. The locking means have a one-piece tilt element which tilts to and fro between two end positions in dependence on the relevant drive direction wherein in each end position a locking of the tilt element takes place with the teeth of the drive wheel. The invention provides a drive acting on both sides to produce a rotary movement which has a small number of individual parts, is simple to fit and is characterized by a compact structure.

33 Claims, 13 Drawing Sheets

Fig. 6c
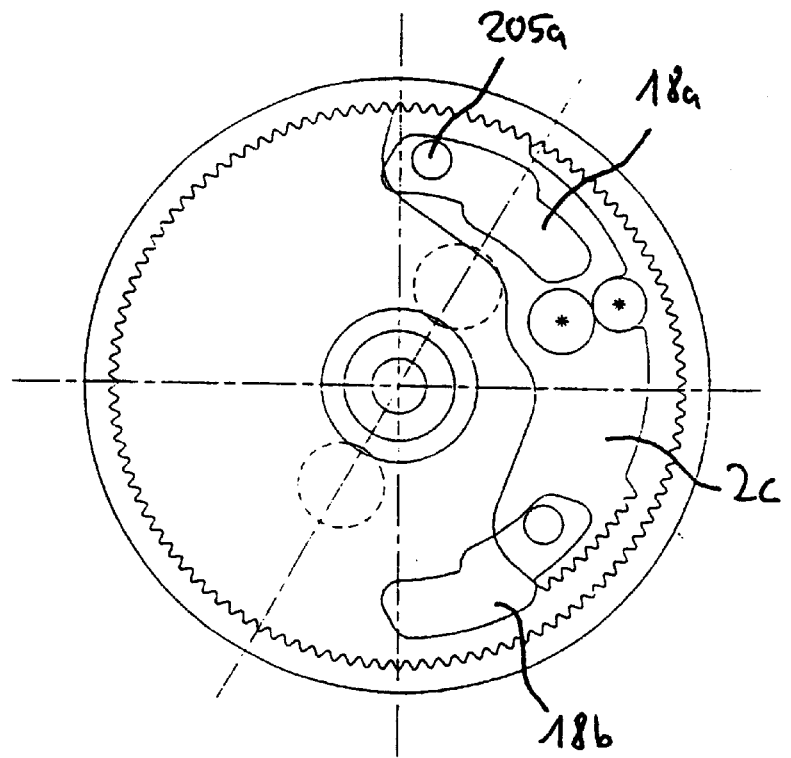
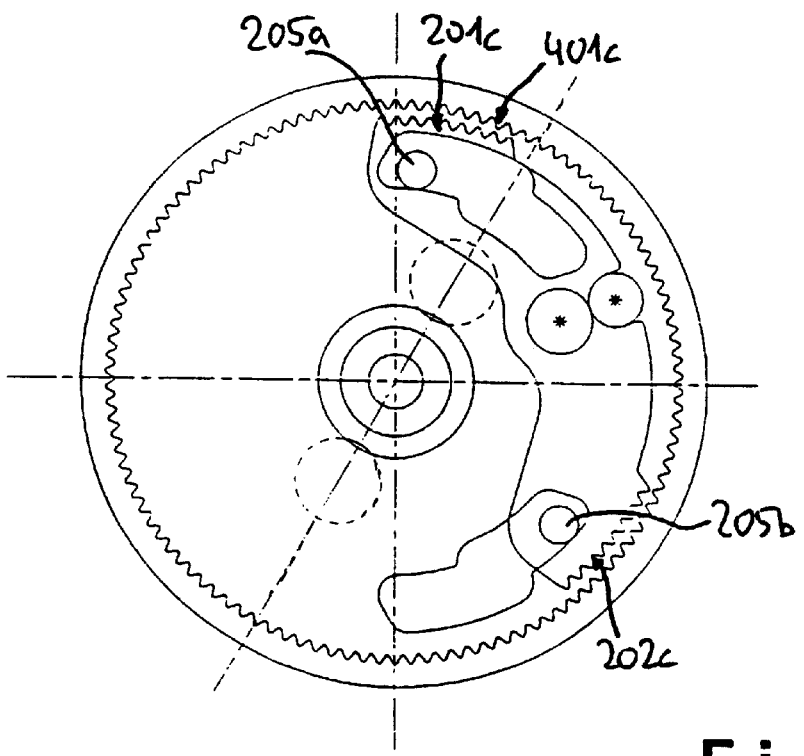
Fig. 6d

Fig. 7c
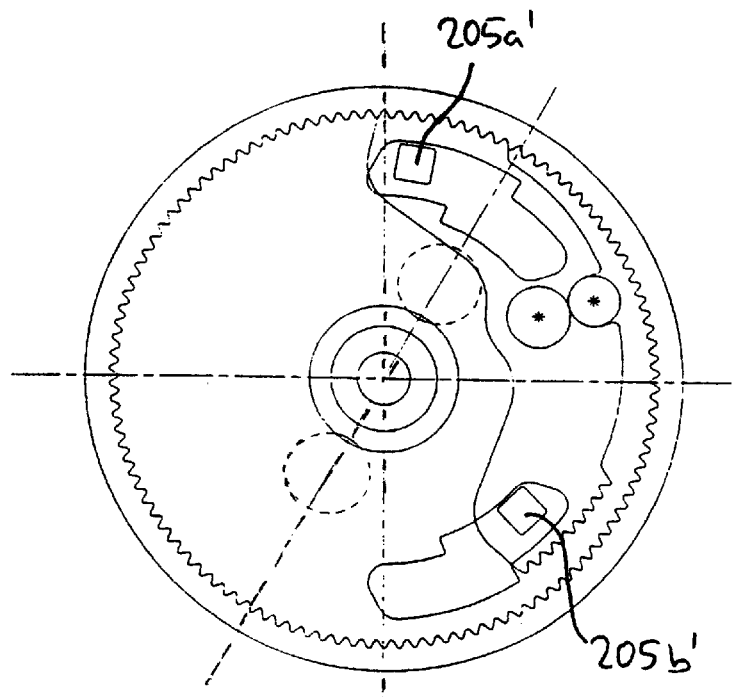
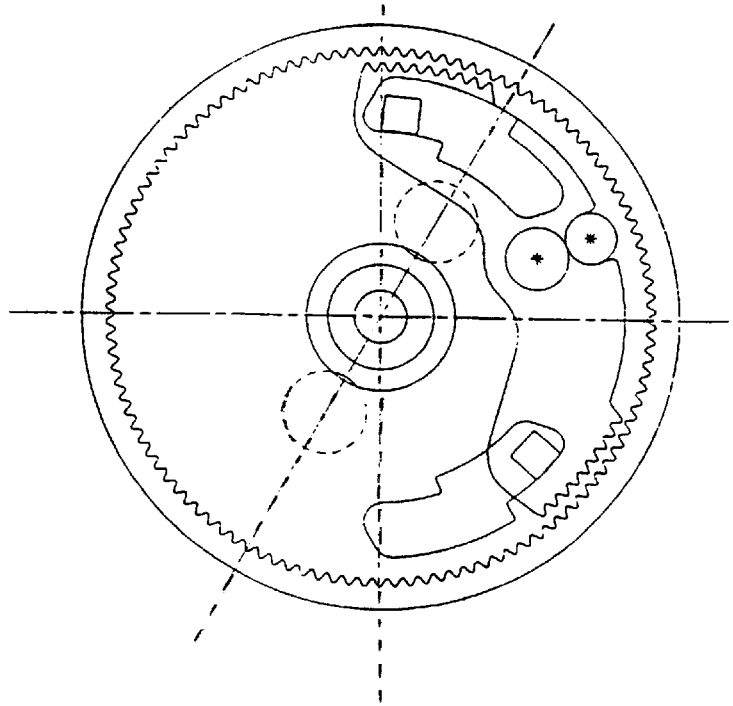
Fig. 7d

Fig. 7e
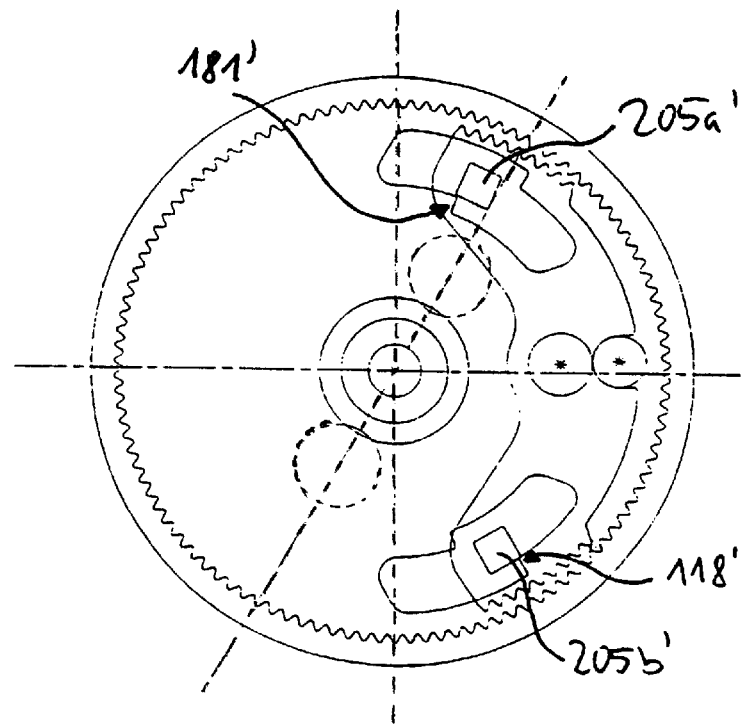
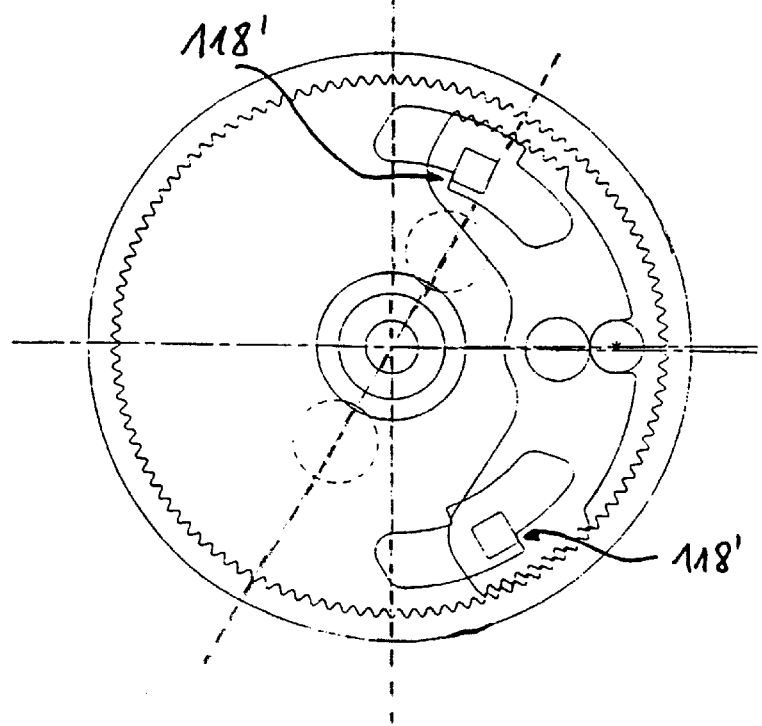
Fig. 7f

TWO-SIDE ADJUSTMENT DRIVE MECHANISM

FIELD OF THE INVENTION

This invention relates to an adjustment drive acting on both sides. A drive of this kind is suitable in particular for use in a manual height or incline adjustment device for a vehicle seat.

BACKGROUND OF THE INVENTION

From DE 195 27 912 A1 a drive acting on both sides is known wherein the drive lever is mounted on a drive axle and supports swivel locking elements whose free ends are provided with toothed elements that can be brought into engagement with the gearing mounted on the circumference of a drive wheel. A slide guide is associated with the swivel locking elements and lifts the relevant unloaded locking element away from the gearing of the drive wheel depending on the swivel direction of the drive lever. Spring areas are thereby provided both sides and outside the slide guide to exert on the locking elements a force which is directed against the engagement direction of the teeth whereby so-called ratchet noises are avoided.

In one embodiment the gearing provided on the circumference of the drive wheel has internal teeth and the locking elements are mounted on an axis of the drive lever inside the circumference formed by the internal teeth.

One disadvantage with the adjustment drives known from DE 195 27 912 A1 is, on the one hand, the relatively large number of parts. More particularly two independent locking elements are required for an adjustment acting on both sides. This also entails a correspondingly large structural space for the adjustment drive. On the other hand a relatively expensive construction is required in order to provide a defined guide for the locking elements and to avoid the teeth of the locking elements catching on the teeth of the drive wheel as the drive lever is returned to the neutral position. JP A 05176819 describes an adjustment mechanism for adjusting the incline of the seat back of a vehicle seat wherein on operating an operating lever an unlocking action occurs and free adjustment of the incline of the seat back can then be carried out. On releasing the operating lever renewed locking occurs. For locking, two locking parts coupled to the operating lever and mounted rotatable on a spindle are provided with toothed areas which can be brought into engagement with counter teeth and can be brought out of and into engagement with the counter teeth by operating and releasing the operating lever accordingly.

SUMMARY OF THE INVENTION

The object of the invention is to provide a drive operating on both sides to produce a rotary movement which has a low number of individual parts, which is easy to fit and which is characterized by a compact structure.

The solution according to the invention proposes using, as the locking means, a one-piece tilt element which can be tilted to and fro between two end positions and which in each end position according to the existing drive direction transfers a torque to the drive wheel. The use of two separate locking elements is hereby unnecessary and the structural space required is minimized.

At the same time, compared with the use of two separate locking elements, the fitting expense is reduced since riveting the locking elements to the drive lever is eliminated.

As a result of the forces engaging on the tilt element tilting the tilt element can only take place when the swivel movement of the drive lever is out of the neutral position. During a resetting movement of the drive lever, the tilt element automatically comes out of engagement with the teeth of the drive wheel so that it is ensured that the drive wheel is not entrained during the resetting movement.

In a preferred embodiment of the invention, the tilt element is mounted to tilt on two radially spaced bearing points of the drive. The two bearing points are formed on two drive parts which can swivel independently of each other about the drive axis. The one bearing point is thereby formed, in a preferred design, on the drive lever and the other bearing point is formed on a holding plate. The holding plate, on the driven side, adjoins the drive lever wherein the drive lever and holding plate are coupled together by the tilt element.

As a result of the radial spacing between the two bearing points, during operation of the drive lever from the neutral position, a torque is exerted on the tilt element so that the latter tilts in dependence on the drive direction into one or the other end position and comes into engagement with the teeth of the drive wheel. A tilt movement of the tilt element is thereby caused in that during a swivel movement of the drive lever from the neutral position, the bearing point formed on the drive lever is likewise swivelled while the bearing point formed on the holding plate first jams in its position and thereby produces a counter moment.

The holding plate jams as a result of the inertia as well as through the friction forces in its starting or neutral position whereby the tilt element tilts. After the tilt element has tilted into the corresponding end position and has passed into engagement with the teeth of the drive wheel, as a result of the coupling between the drive lever and holding plate, a rotary movement of the holding plate takes place.

In an advantageous development of the invention, the tilt element represents a rocker arm which has two spaced toothed areas arranged on the circular circumference. In each end position of the rocker arm one of the toothed areas thereby comes into engagement with the teeth of the drive wheel. The rocker arm is preferably constructed axially symmetrical whereby the two bearing points of the rocker arm lie on the axis of symmetry. It is hereby guaranteed that the drive functions in the same way in both drive directions.

Alternatively the rocker arm is designed asymmetrically so that a different play between the rocker arm and drive wheel and different lift angles exist in the two drive directions. This design is advisable if a different lift is to be produced depending on the drive direction.

In one embodiment of the invention it is proposed that the toothed areas of the rocker arm as well as the teeth of the drive wheel are not actually formed as cogs but are formed flat. The relevant surfaces have, however, a high coefficient of friction so that a locking of the rocker arm with the drive wheel takes place through friction engagement. The advantage with this design is that no teeth have to be formed on the rocker arm and drive wheel.

In a first variation of the invention, means are provided which, during swivel movement of the drive lever out from the neutral position, counteract a corresponding rotation of the holding plate out from its neutral position. A jamming or brake action of the holding plate of this kind is advantageous since the counter moment is thereby provided on the tilt element or rocker arm for a secure engagement of the toothed areas of the tilt element with the teeth of the drive wheel. Different embodiments are provided for producing such an action of the holding plate.

In a first embodiment, a rotary spring is provided which is fixed on the holding plate. During rotation of the holding plate, the rotary spring is tensioned so that a resetting moment acts on the holding plate in the direction of the neutral position. The rotary spring thus tries to hold the holding plate constantly in the neutral position. With a deflection of the drive lever and a torque exerted on the holding plate as a result of the coupling between the drive lever/tilt element/holding plate, the rotary spring, as a result of its torque acting in the opposite direction on the holding plate, produces a counter moment which leads to a secure tilt and engagement of the tilt element.

In a second embodiment, a counter moment is only produced in the neutral position of the holding plate. To this end a detent element is provided in which the holding plate catches detachably in the neutral position. The detent element is preferably a detent spring which exerts an axial force on the holding plate and through a friction or brake moment connected therewith counteracts the holding plate turning out of the neutral position. After the holding plate has been turned out of the neutral position and the tilt element has tilted as a result of the coupling with the drive lever, the detent spring slides beyond the tilt element. In another embodiment, the detent element is formed as a detent ball which, in the neutral position, engages in an indentation in the holding plate.

By using means which counteract a rotation of the holding plate out of the neutral position, the play and thus the idling of the drive lever at the start of a swivel movement is reduced through a reliable immediate tilting of the tilt element.

In a second variation of the invention, the tilt element is associated with a slide guide which guides the tilt element during activation of the drive lever on a defined path and ensures the tilt element is reset as the drive lever is returned into the neutral position. To this end the tilt element has two symmetrically arranged cams or bolts which are guided in the slide guide. The slide guide is thereby preferably formed in the cover plate of the drive which adjoins the drive lever on the drive side. Alternatively, the slide guide is formed on the drive lever itself.

Guiding the tilt element in a slide guide reliably prevents the teeth of the tilt element, and those of the drive wheel, from sliding on each other during the resetting movement which would produce a ratchet noise. The adjustment drive can thereby be formed with a very low noise level.

The drive according to the invention has a return spring for returning the drive lever to its neutral position after a swivel process. The return spring is coupled, on one side, to a housing stop fixed on the housing and, on the other side, to the drive lever or to a stop connected therewith. From DE 195 27 912 A1, mentioned above, it is known to mount the return spring on the brake housing of a brake device of the drive. The brake device is thereby in connection with the drive shaft so that a torque transfer on the output side is blocked while a torque transfer on the drive side is possible. The construction and function of brake devices of this kind are known from the prior art such as, for example, from DE 41 20 617 A1.

As an alternative to the arrangement of the return spring on a brake housing, it is possible to fit the return spring in the free interior of the drive wheel. By integrating the return spring in the structural space immediately adjoining the drive lever, the complexity of the drive is advantageously further increased and further space is saved. As before the return spring is thereby fixed by one spring end to a stop fixed on the housing in order to undergo tensioning when the drive lever is deflected.

The drive, according to the invention, has an output element such as a pinion to which the rotary movement produced by the drive is transferred. In order to transfer the rotary movement to the output element, two alternatives are provided. In a first alternative, the drive wheel is rigidly connected to a drive shaft whose axis coincides with the swivel axis of the drive lever. The output element is likewise connected rotationally secured to the drive shaft so that the rotary movement transferred by the drive lever to the drive wheel is transferred directly to the drive shaft and from this to the output element.

Alternatively, the drive wheel itself forms the element to be driven. An actual shaft is not provided in this embodiment. Rather the drive lever, holding plate, drive wheel and the further elements of the drive are mounted on a stepped bolt without having to be connected rotationally secured to same. The drive wheel is thereby coupled with the output element so that a rotary movement of the drive wheel is likewise transferred to the output element.

It should be pointed out that the teeth of the drive wheel are advantageously formed as internal teeth. This allows the tilt element and holding plate to be mounted in the inner structural space of the drive wheel and leads to a very compact and space-saving construction of the drive. However, it is fundamentally also within the scope of the invention to provide external teeth on the drive wheel whereby the tilt element is then mounted to tilt outside of the drive wheel and engage in external teeth on a drive wheel.

BRIEF DESCRIPTION OF THE DRAWINGS

The invention will now be explained in further detail with reference to various embodiments shown in the accompanying drawings in which:

FIGS. 6*a* to 6*f* show the path of movement of the tilt element of a further drive according to the invention during swivel movement of the drive lever whereby the tilt element is guided in a slide guide by means of circular cams;

FIGS. 7*a* to 7*f* show the path of movement of the tilt element of a further device according to the invention during swivel movement of the drive lever wherein the drive corresponds to the drive of FIGS. 6*a* to 6*f* except that the cams guided in the slide guide are square.

DETAILED DESCRIPTION OF THE INVENTION

Figure 1:
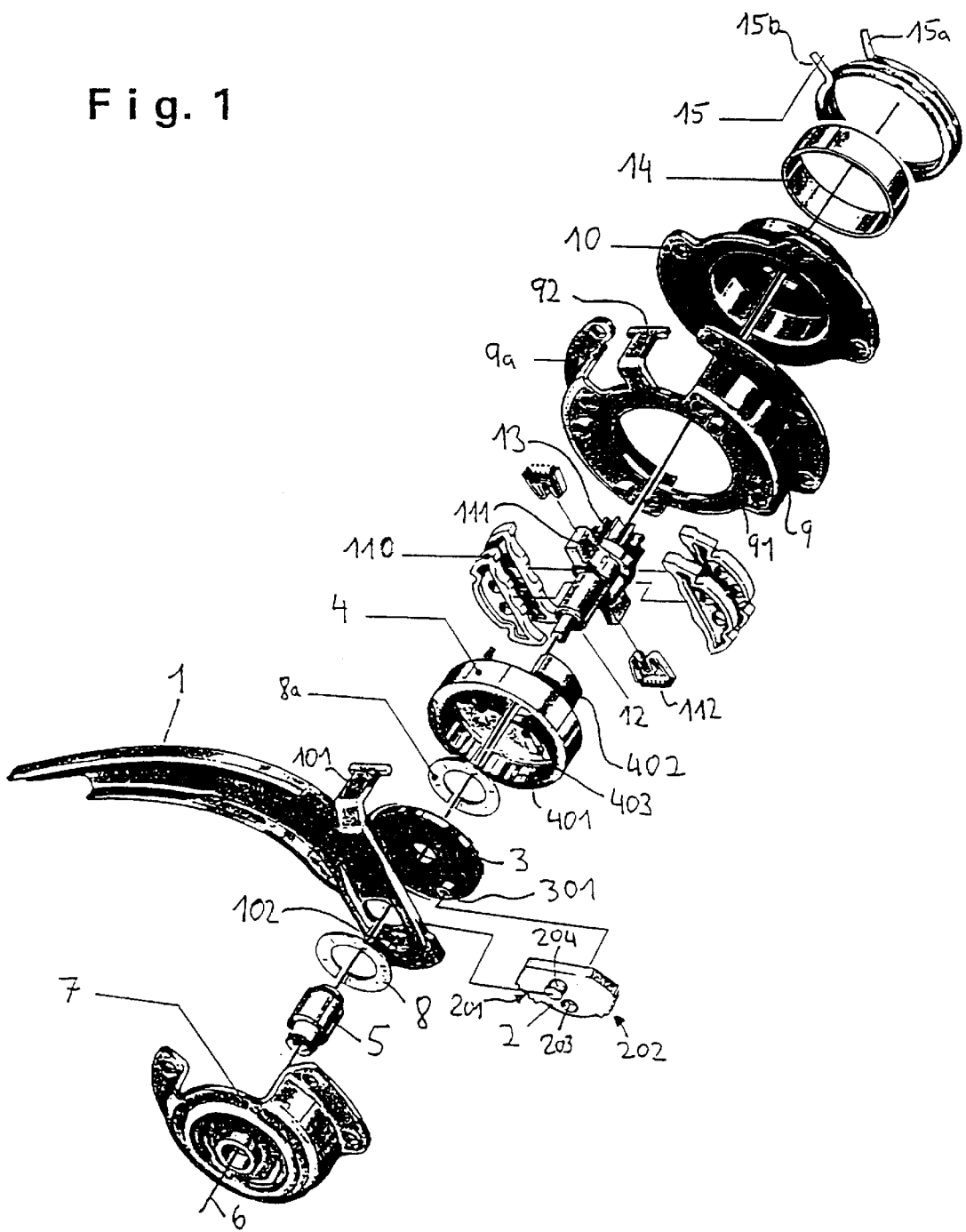
FIG. 1 is an explosive view of a first embodiment of a drive according to the invention.
Figure 2:
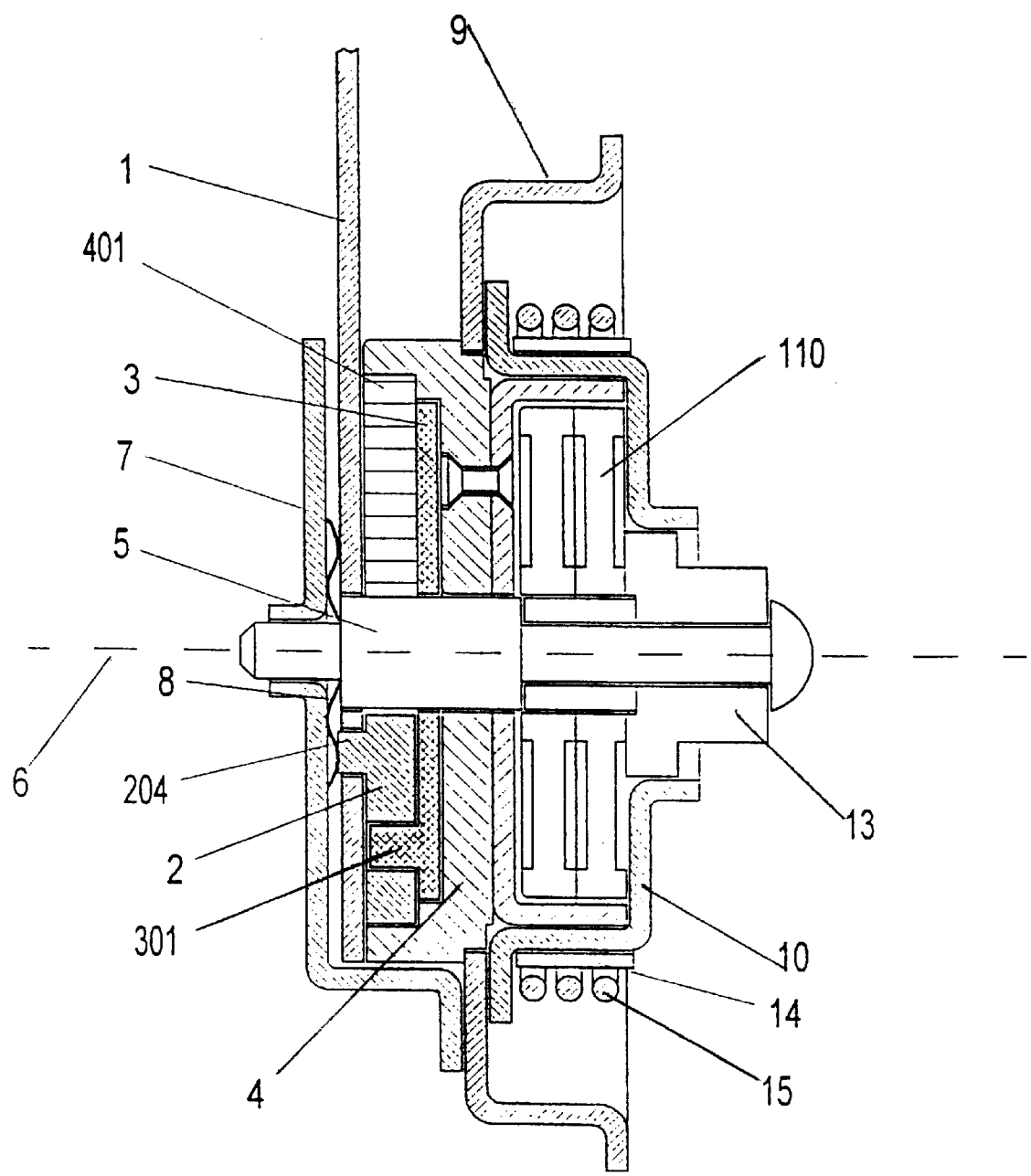
FIG. 2 is a cross-sectional view of the drive of FIG. 1.

FIGS. 1 and 2 show the basic structure of an adjustment drive acting on both sides, according to the invention. A drive lever 1, a rocker arm 2, a holding plate 3 and a drive wheel 4 with inner teeth 401 are mounted on a spacer sleeve 5 which is mounted along a drive axis 6. The drive lever 1, the rocker arm 2, the holding plate 3 and the drive wheel 4 are covered by a cover plate 7 which is likewise mounted on the spacer sleeve 5 which is formed as a stepped bolt.

Between the cover plate 7 and the drive lever 1 is a spring 8 formed as a corrugated disc to exert an axial force on the individual drive elements and ensure that the drive elements fixedly adjoin one another substantially without play. In one embodiment of the invention, corrugated spring 8a is placed between the holding plate 3 and drive wheel 4. Spring 8a can, however, be dispensed with if required and is not shown in FIG. 2.

The drive wheel 4 is adjoined on the output side by a fixing support 9 and a brake device 11 which is mounted in a brake housing 10. The fixing support 9 is fastened by fixing faces 9a to a fixed supporting element such as for example the side part of a motor vehicle seat.

Furthermore sleeves 91 are provided on the fixing support 9 to secure the cover plate 7.

The brake device 11 mounted in the brake housing 10 has, in the manner known from DE 41 20 617 A1, clamping elements 110 which are in active connection with wings 111 of a bolt 12 mounted on the drive axis 6, shaped springs 112, as well as with cylinder-sleeve-like claws 402 and assembly openings 403 of the drive wheel 4. An output pinion 13 rotationally secured to the wings 111 is mounted on the output side of the bolt 12. The output pinion 13 engages in a gearing device, such as for the height or incline adjustment of a vehicle seat.

The brake device 11 functions so that during action of a torque on the output side of the pinion 13, the clamping elements 110 are clamped on the inner wall of the brake housing 10 and a torque transfer is thereby blocked. With a torque transfer on the drive side, however, the locking action is lifted. The brake device 11 thus prevents an adjustment of the drive from taking place when external forces occur. More particularly it ensures that the pinion 13 cannot rotate with the occurrence of crash forces.

A return spring 15 is mounted on a bush 14 on the outer circumference of the brake housing 10 and has two spring arms 15a, 15b on which engage, on the one hand, a housing bracket 92 of the fixing support 9 fixed relative to the housing and, on the other hand, a return bracket 101 of the drive lever 1 extending from the drive lever towards the return spring 15. The two brackets 92, 101 are thereby clamped between the two free ends 15a, 15b of the return spring 15.

The use of a bush 14 for supporting the return spring 15 is optional and is provided particularly for the occurrence of higher loads.

The rocker arm 2 has two symmetrically arranged toothed areas 201, 202 lying on the circular circumference wherein, depending on the drive direction, one of the toothed areas 201, 202 can be brought into engagement with the inner teeth 401 of the drive wheel 4. Two bearing points are arranged on the axis of symmetry of the rocker arm 2 spaced out radially relative to the drive axis 6 and through which the rocker arm 2 can be connected on the one hand to the drive lever 1 and on the other to the holding plate 3. The bearing point between rocker arm 2 and drive lever 1 is thereby formed by a pin or stud 204 which engages in a corresponding recess 102 in the drive lever 1. In a corresponding manner the bearing point between holding plate 3 and rocker arm 2 is formed by a pin or stud 301 of the holding plate 3 which engages in a hole 203 of the rocker arm 2.

The rocker arm is preferably formed as a sintered part wherein the pin 204 is pressed into the sintered part. The holding plate 3 consists preferably of plastic in order to keep down the weight of the drive. The pin 302 is formed, for example, in one piece on the holding plate 3. Alternatively, the rocker arm consists of plastic.

With a swivel movement of the drive lever 1 out of the neutral position the pin 204 of the rocker arm 2 mounted in the hole 102 of the drive lever 1 is likewise swivelled about the drive axis 6. As a result of friction forces between the holding plate 3 and spacer sleeve 5, as well as where applicable the drive wheel 4, the holder plate 3 is first stopped from co-rotating with the drive lever 1. The pin 301 of the holding plate 3 thereby forms a counter bearing so that a torque arises on the rocker arm 2, the rocker arm 2 tilts and depending on the drive direction, one of the toothed areas 201, 202 of the rocker arm 2 engages in the teeth 401 of the drive wheel 4.

As the drive lever 1 is swivelled upwards out of the neutral position the rocker arm 2 is tilted, for example, to the left so that the toothed area 201 enters into engagement with the teeth 401 of the drive wheel 4. In this way, a rotary movement of the drive lever 1 is transferred to the drive wheel 4.

As the drive lever 1 is swivelled back into the neutral position the torque on the rocker arm 2 is lifted so that the toothed area 201, 202 of the rocker arm 2 set in engagement passes out of engagement with the toothed area 401 of the drive wheel 4 and the drive lever 1, rocker arm 2 and holding plate 3 move back into the neutral position without this resetting movement being transferred to the drive wheel 4.

A rotary movement of the drive wheel 4 caused by the drive lever 1 is transferred to the output pinion 13 through the assembly openings 403 of the drive wheel 4 and the wings 111 of the brake device 11 rotationally secured to the output pinion 13. Through this type of transfer of rotary movement to the output pinion 13, the drive and brake device 11 are uncoupled.

In an alternative embodiment (not shown) it is proposed that the drive wheel is mounted rotationally fixed on a drive axis so that a rotary movement of the drive wheel is transferred to the drive axis. The output pinion is in this embodiment likewise rotationally secured to the drive shaft. Also in this embodiment a brake device is provided with clamping elements which, when a torque on the output side is placed against the output pinion, are pressed against the brake housing and thereby block rotation.

Figure 3:
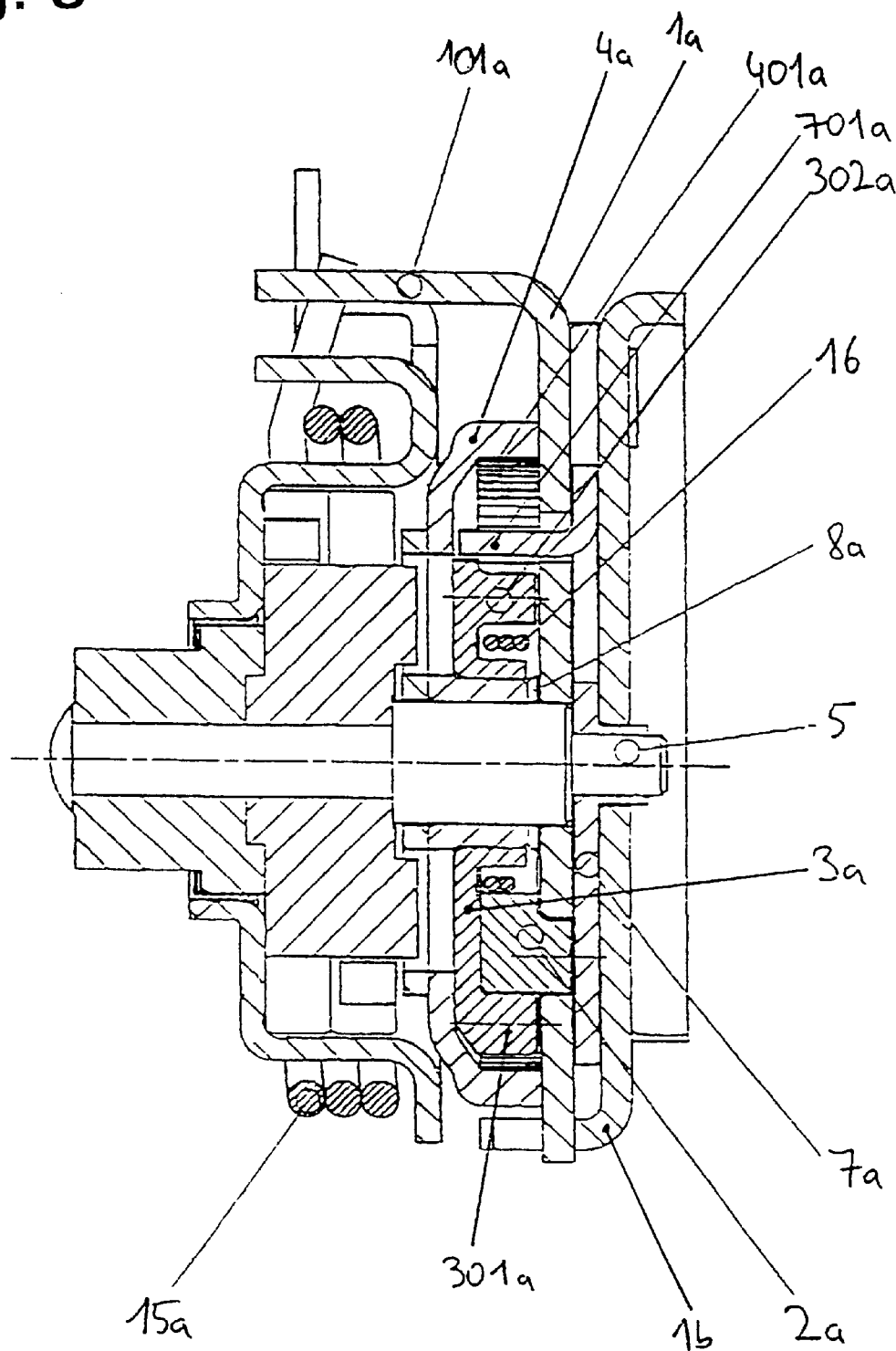
FIG. 3 is a cross-sectional view of a second embodiment of a drive according to the invention wherein the holding plate is coupled to a rotary spring.
Figure 4A:
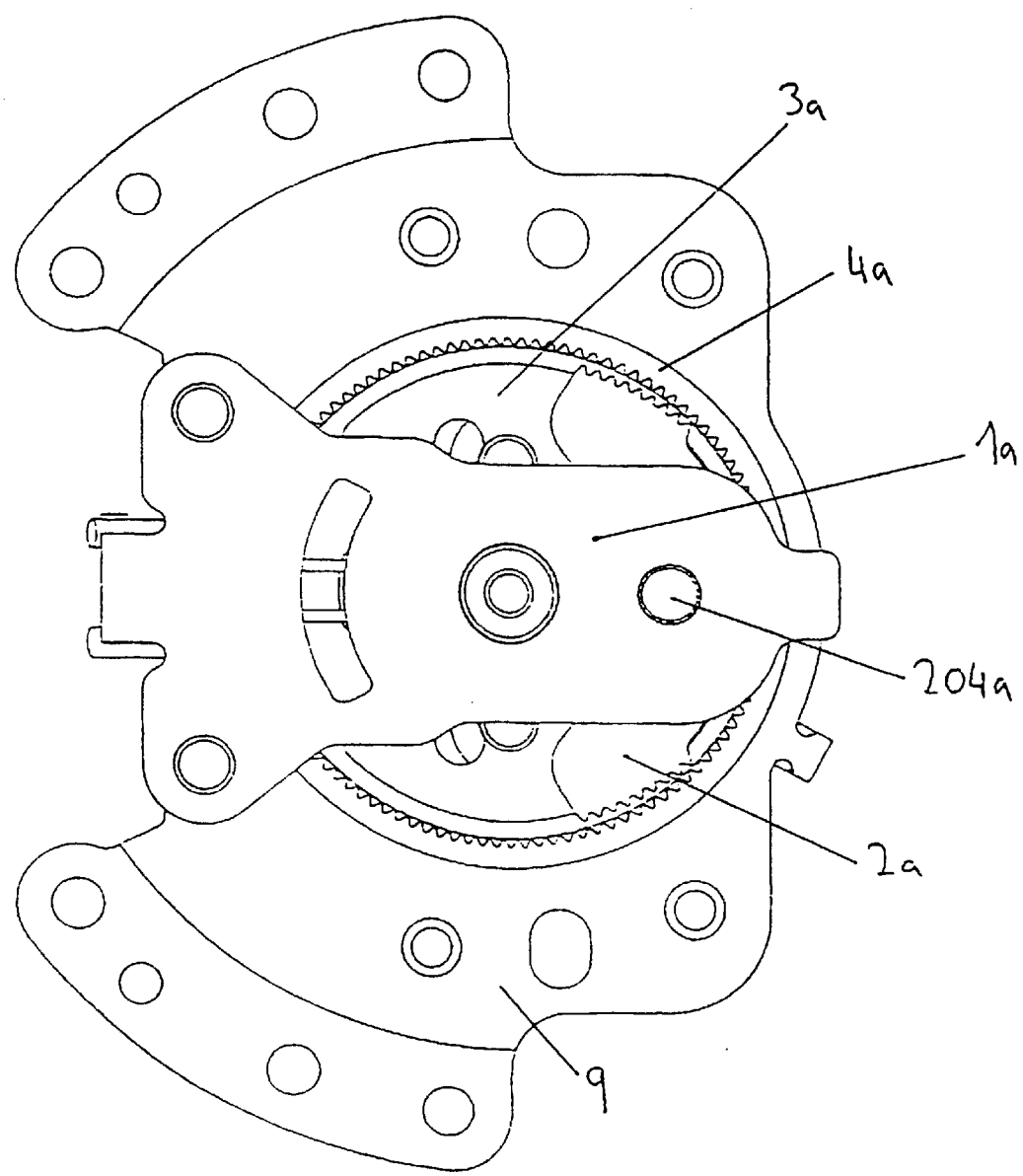
FIG. 4*a* is a side view of the drive of FIG. 3.
Figure 4B:
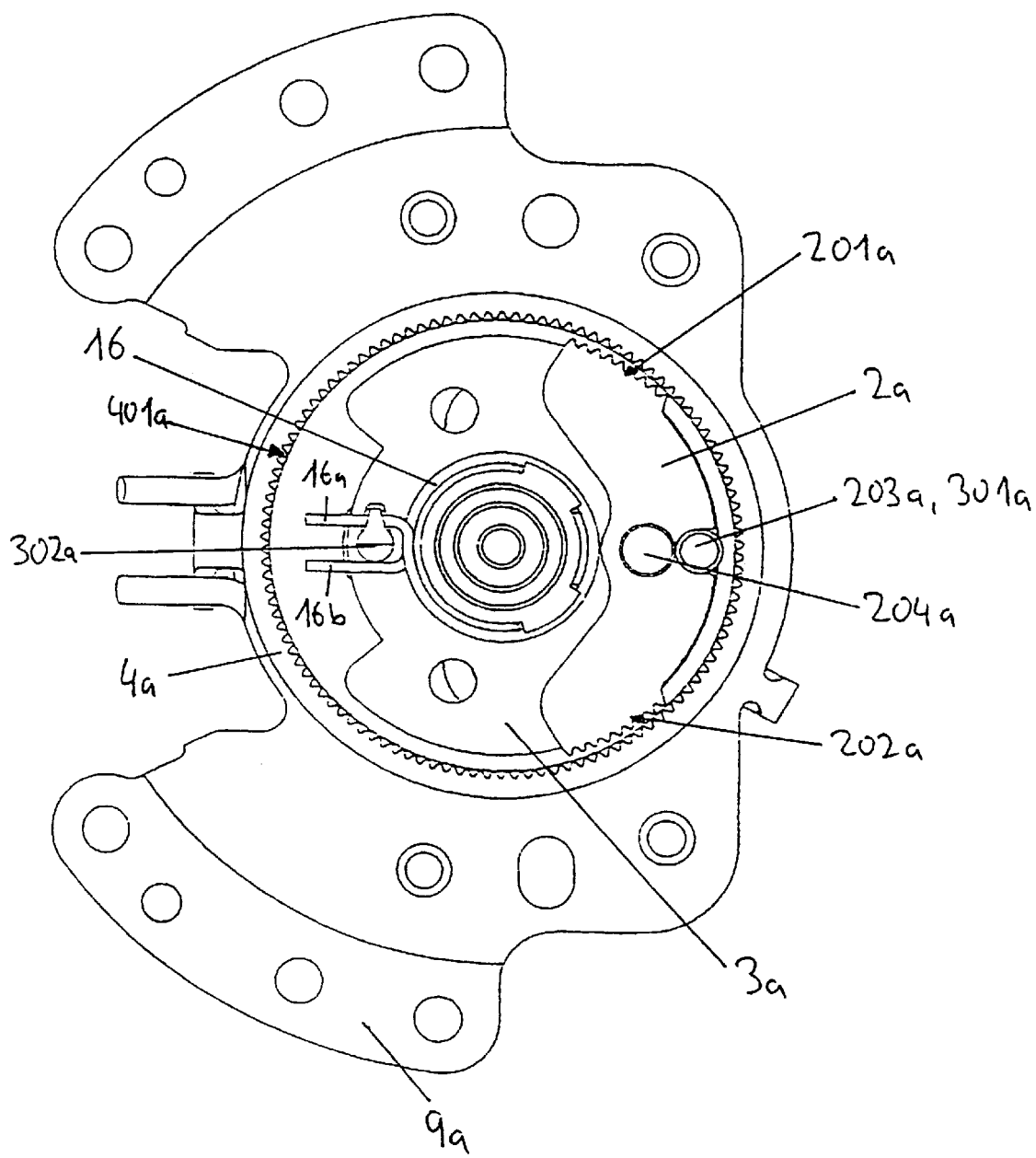
FIG. 4*b* is the view of FIG. 4*a*, but without showing the drive lever.

FIGS. 3, 4a and 4b show a further development of the invention in which a rotary spring 16 is connected to the holding plate so that with a deflection of the holding plate out of the neutral position a resetting torque acts on the holding plate. The construction and functioning method of the drive acting on both sides, shown in FIGS. 3, 4a and 4b are thereby explained only where they differ from the construction and functioning method of the drive of FIGS. 1 and 2.

As can be seen in particular from FIGS. 4a and 4b, a rocker arm 2a serving as a tilt element is provided with toothed areas 201a and 202a and is connected in a first bearing point 203a to a holding plate 3a and in a second bearing point 204a to a drive lever 1a. A rotary spring 16 provided on the holding plate 3a symmetrically with the drive axis 6 has two spring ends 16a, 16b which adjoin a stud 302a of the holding plate 3a.

According to FIG. 3 a bracket 701a of the cover plate 7a (not shown in FIGS. 4a and 4b) engages between the two spring ends 16a, 16b and thereby provides a stop fixed relative to the housing. The drive lever is in the present embodiment divided into two parts and consists of a lever holding plate 1a and an operating lever 1b which are fixedly connected together and which are mounted on each side of the cover plate 7a and which are both supported on same.

The lever holding plate 1a forms, according to FIG. 3, a return bracket 101a which engages with one spring end of the return spring 15a, as described with reference to FIGS. 1 and 2.

As the operating lever 1b or the lever holding plate 1a is swivelled out of the neutral position the bearing point 204a between the lever holding plate 1a and rocker arm 2a is co-rotated. Since the rocker arm 2a is likewise mounted in the bearing point 203a of the rocker arm 2a and holding plate 3a during deflection of the drive lever 1a, a torque also engages on the holding plate 3a. A rotation of the holding plate 3a is, however, counteracted by the rotary spring 16 which is supported on one side on the stud 302a of the holding plate 3a and on the other on the bracket 701 of the cover plate 7.

As a result of this spring force during rotation of the holding plate 3a from the neutral position a resetting torque acts on the holding plate 3a so that this is caused to stay in the neutral position. The rotary spring 16 thereby produces the required counter moment which ensures safe tilting and engagement of the rocket arm 2a in the teeth 401a of the drive wheel 4a. Since the stud 301a is caused to jam in the neutral position and oppose a rotation, the rocker arm 2a is safely tilted.

Furthermore, the rotary spring 16 ensures that, as the drive lever 1a, 1b swivels back into the neutral position, the holding plate 3a likewise returns defined and with minimum play into the neutral position so that with renewed activation of the drive lever 1a, 1b the rocker arm 2a tilts again immediately and with minimum idling a further rotation, is transferred to the drive wheel 4a.

Figure 5A:
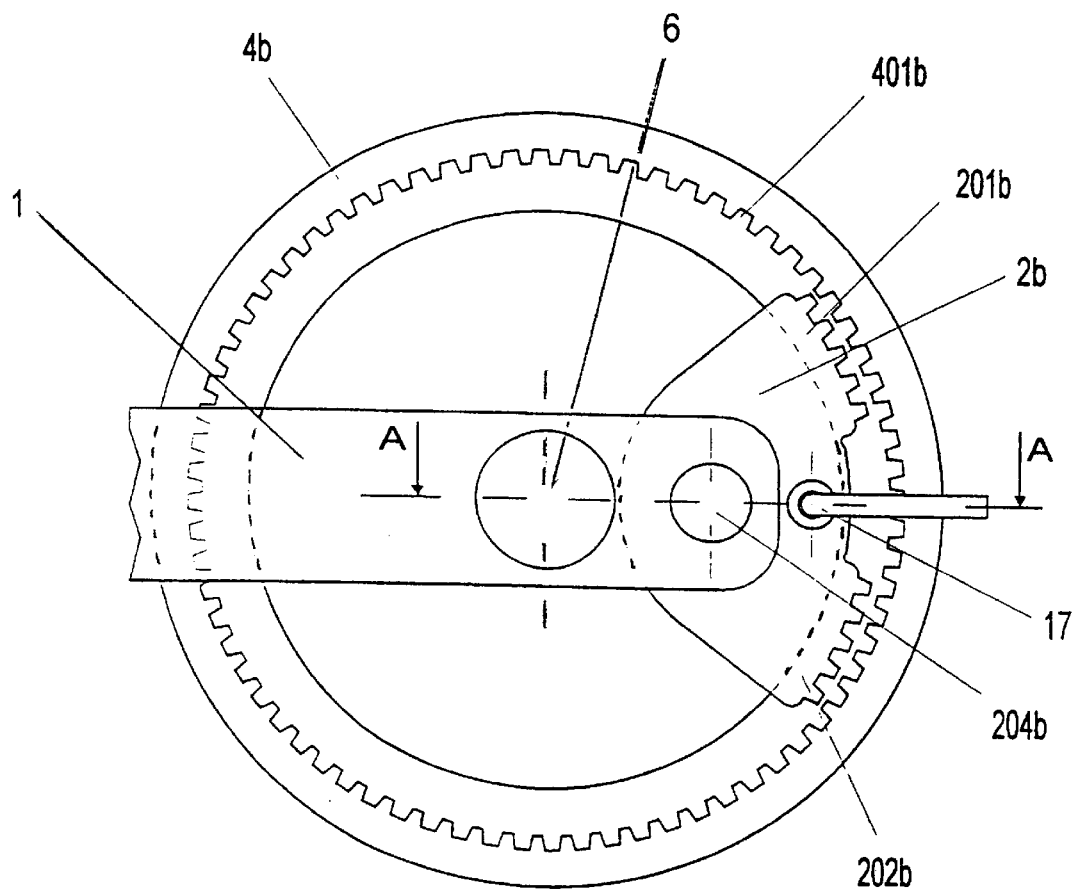
FIG. 5*a* is a side view of a further embodiment of a drive according to the invention wherein a detent spring produces a defined braking movement on the holding plate.
Figure 5B:
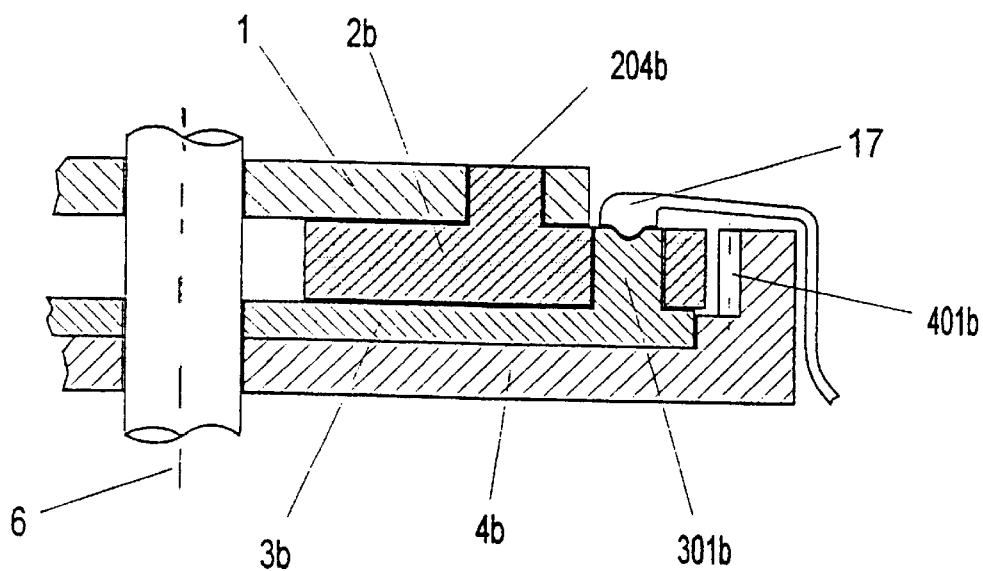
FIG. 5*b* is a cross-sectional view of FIG. 5*a* taken along line A—A.

FIGS. 5a and 5b show a further variation of a drive according to the invention. The figures show a drive lever 1 which is mounted on a drive axis 6. The drive lever 1 is connected in a first bearing point 204b to a rocker arm 2b. The rocker arm 2b has again toothed areas 201b, 202b which can be brought into engagement with inner teeth 401b of a drive wheel 4b. A second bearing point of the rocker arm 2b is formed by a stud 301b of a holding plate 3b which engages in a corresponding hole, more particularly an oblong hole of the rocker arm 2b.

The special feature of this embodiment is that a detent spring 17 exerts an axial force on the stud 301b of the holding plate 3b. The friction forces connected therewith initially counteract a rotation of the holding plate 3b whereby the brake moment connected therewith leads to a safe tilting and engagement of the rocker arm 2b. However a defined braking moment is only produced in the neutral position of the holding plate 3b to ensure engagement of the rocker arm 2b. After the holding plate 3b has likewise turned during the course of the swivel movement of the drive lever 1 the detent spring 17 catches over the rocker arm 2b.

It should be pointed out that a small detent trough is formed on the stud 301b of the holding plate in which the detent spring 17 engages. This serves for a defined return of the holding plate 3b into the neutral position and minimizes any possible play which may exist. It is hereby ensured that the rocker arm 2b during renewed swivel movement of the drive lever 1 out of the neutral position is immediately tilted so that an engagement of the teeth of the rocker arm 2b and drive wheel 4b takes place immediately and without idling in order to transfer a rotary movement. It is also ensured that no ratchet noises occur prior to an engagement of the teeth of the rocker arm 2b and drive wheel 4b.

In a further embodiment (not shown), the return spring 15 or 15a of FIGS. 1 to 4b is not mounted on the circumference of the brake housing but is integrated in the structural space between drive wheel and drive lever. By way of example, a bracket of the cover plate fixed relative to the housing and projecting into the structural space serves as the stop on the side of the housing, corresponding to the bracket 701 of FIG. 3. Integrating the resetting spring for the drive lever into the structural space between the drive wheel and drive lever further increases the compact design feature of the drive.

FIGS. 6a to 6f show a design of a drive according to FIGS. 1 and 2 which is provided without a rotary spring or detent element. Instead a slide guide is provided for the rocker arm. FIGS. 6a to 6f show a drive wheel 4c with inner teeth 401c, a rocker arm 2c with two bearing points 203c, 204c, a drive axis 6 as well as two slide guides 18a, 18b in which circular cams 205a, 205b of the rocker arm 2c engage. The slide guide 18a, 18b is thereby formed in the cover plate of the drive.

Figure 6A:
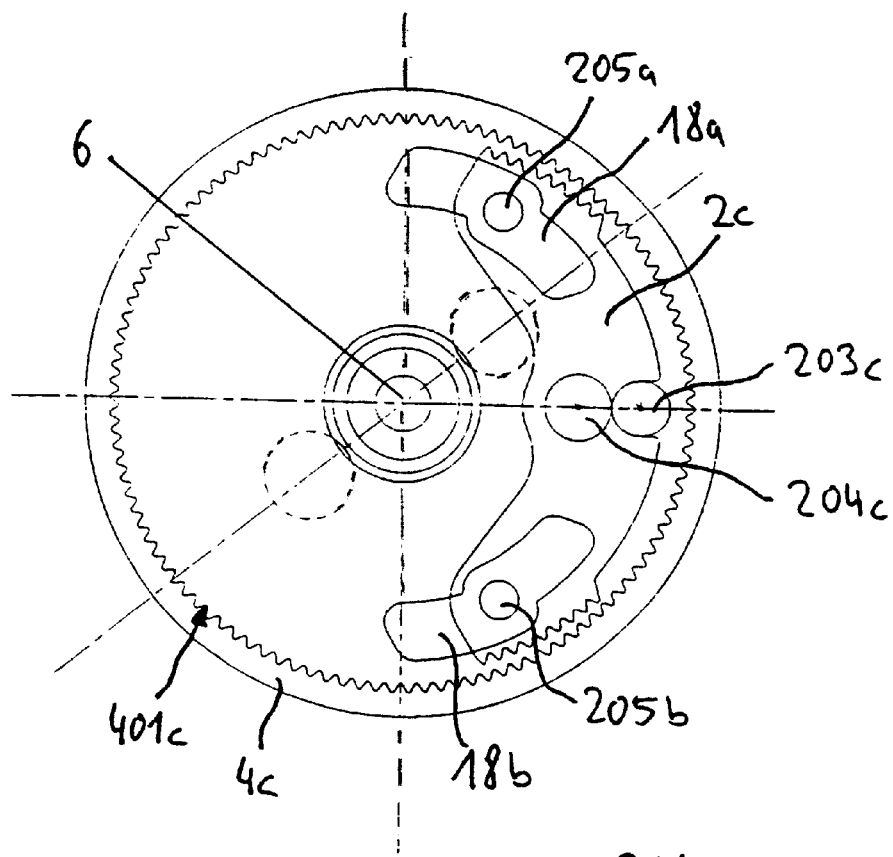
Figure 6B:
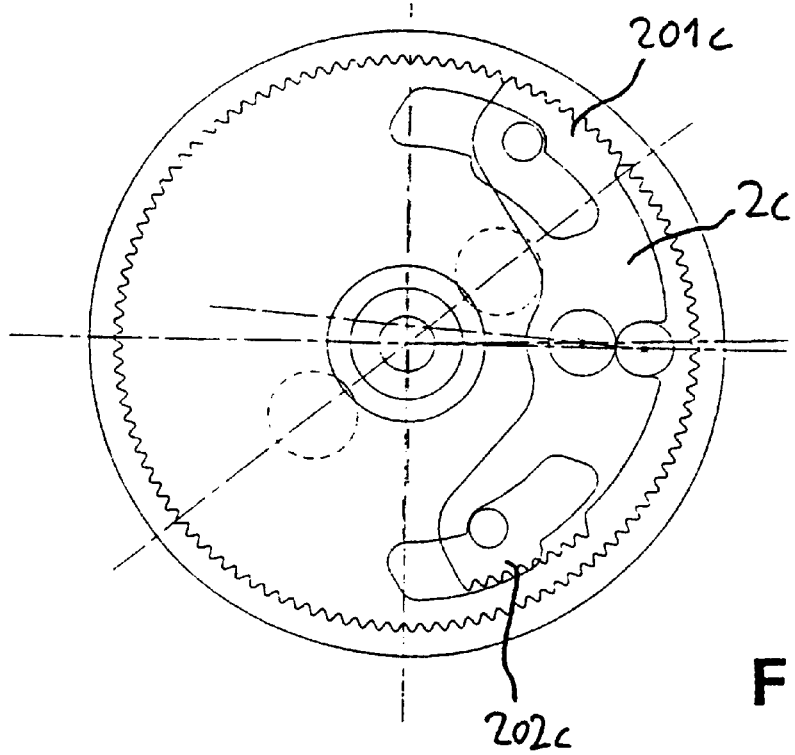
Figure 6E:
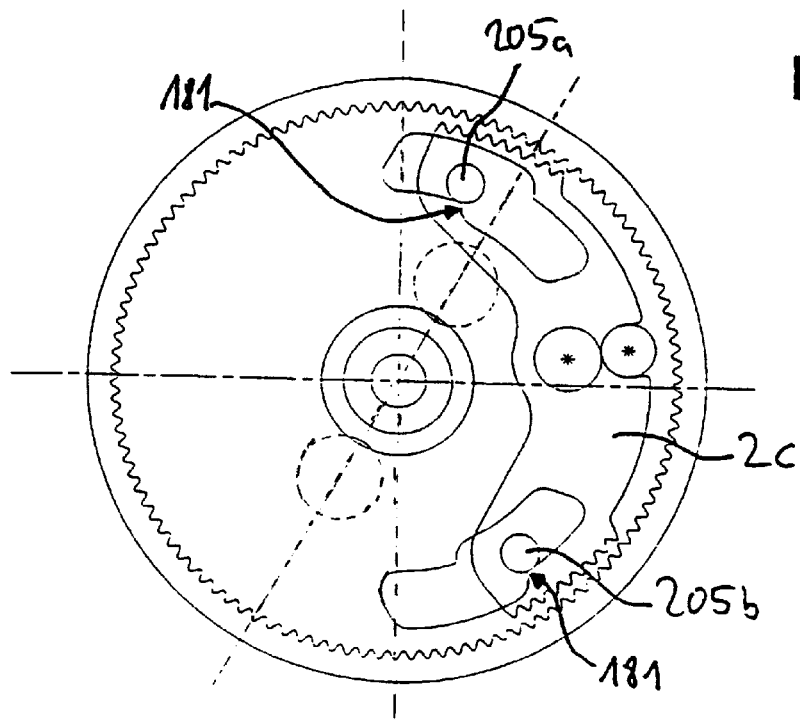
Figure 6F:
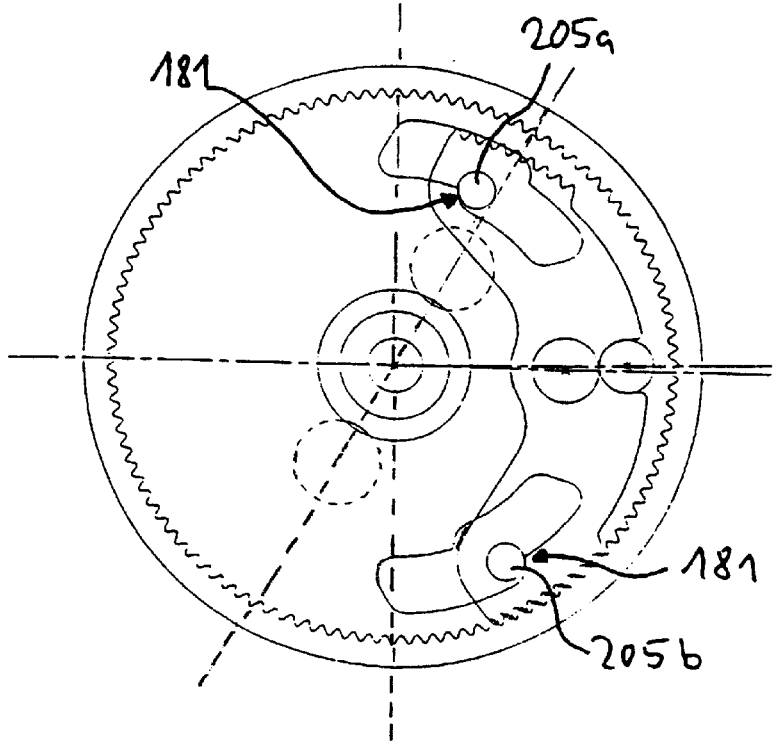
Figure 7A:
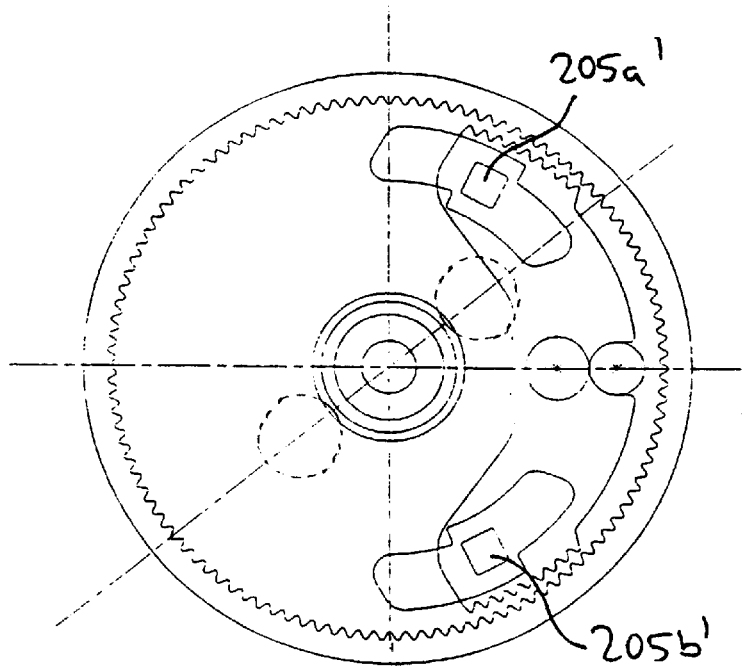
Figure 7B:
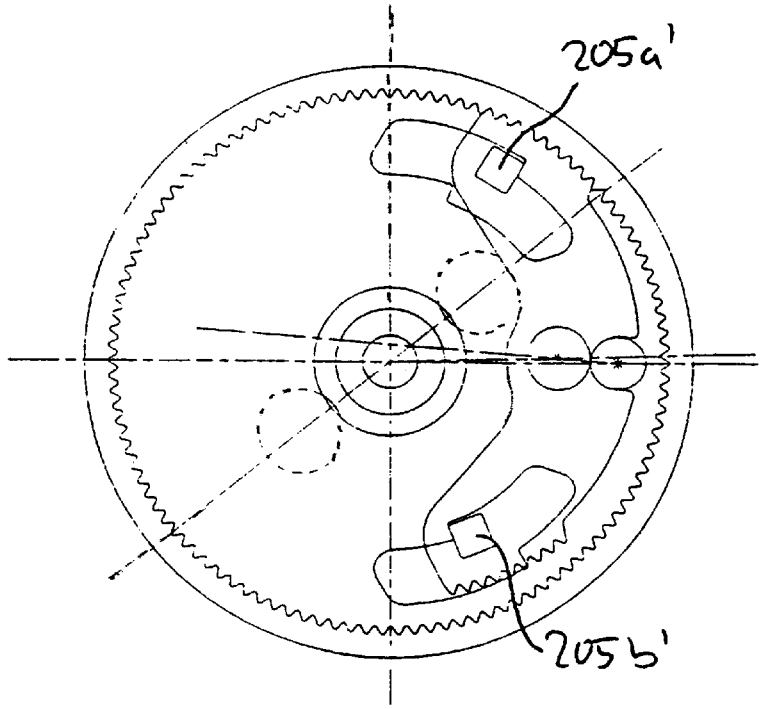

As can be see from FIGS. 6a to 6f, the rocker arm 2c is guided with keyed engagement and defined by the slide guide during a swivel movement of the drive lever. In particular during return of the drive lever into the neutral position the rocker arm 2c is moved back defined and with minimum play. During displacement of the drive lever from the neutral position first the rocker arm 3c tilts wherein one toothed area 201c moves into engagement with the inner teeth 401c of the drive wheel 4c (FIG. 6b). After the maximum swivel movement of the drive lever has passed through (FIG. 6c) the drive lever is let go and moves back into its neutral position owing to the torque of the return spring (not shown).

When the swivel movement of the drive lever is reversed the toothed area 201c passes out of engagement with the teeth 401c (FIG. 6d). The opposite slide guide 18b now prevents the teeth 202c hitherto out of engagement from passing into engagement with the inner teeth 401c of the drive wheel 4c. This must obviously be prevented in order to ensure a reliable silent return of the drive lever and the rocker arm 2c connected therewith and more particularly to prevent a reverse movement of the drive wheel up to reaching the neutral position.

At the end of the resetting movement the original neutral position is not fully reached owing to the existing play. This play is however slight since bend areas 181 are provided in the slide guides 18a, 18b against a flank of which the cams 205a, 205b adjoin in the neutral position whereby a certain centering is achieved.

FIGS. 7a to 7f show a corresponding adjustment path for a further adjustment drive which only differs from the adjustment drive of FIGS. 6a to 6f in that the relevant cams 205a', 205b' are rectangular and the bend areas 118' of the slide guides 18a, 18b are likewise formed substantially rectangular accordingly. The neutral position is hereby reached later during a resetting movement so that a lower idling occurs at the drive lever. With angular cams 205a' the play is thus smaller than in the case of circular cams 205a. The neutral position is thus defined with a high resolution.

It is pointed out here that it is within the scope of the invention to also provide the embodiments of FIGS. 1 to 4a additionally with a slide guide according to FIGS. 6 and 7.

Figure 8:
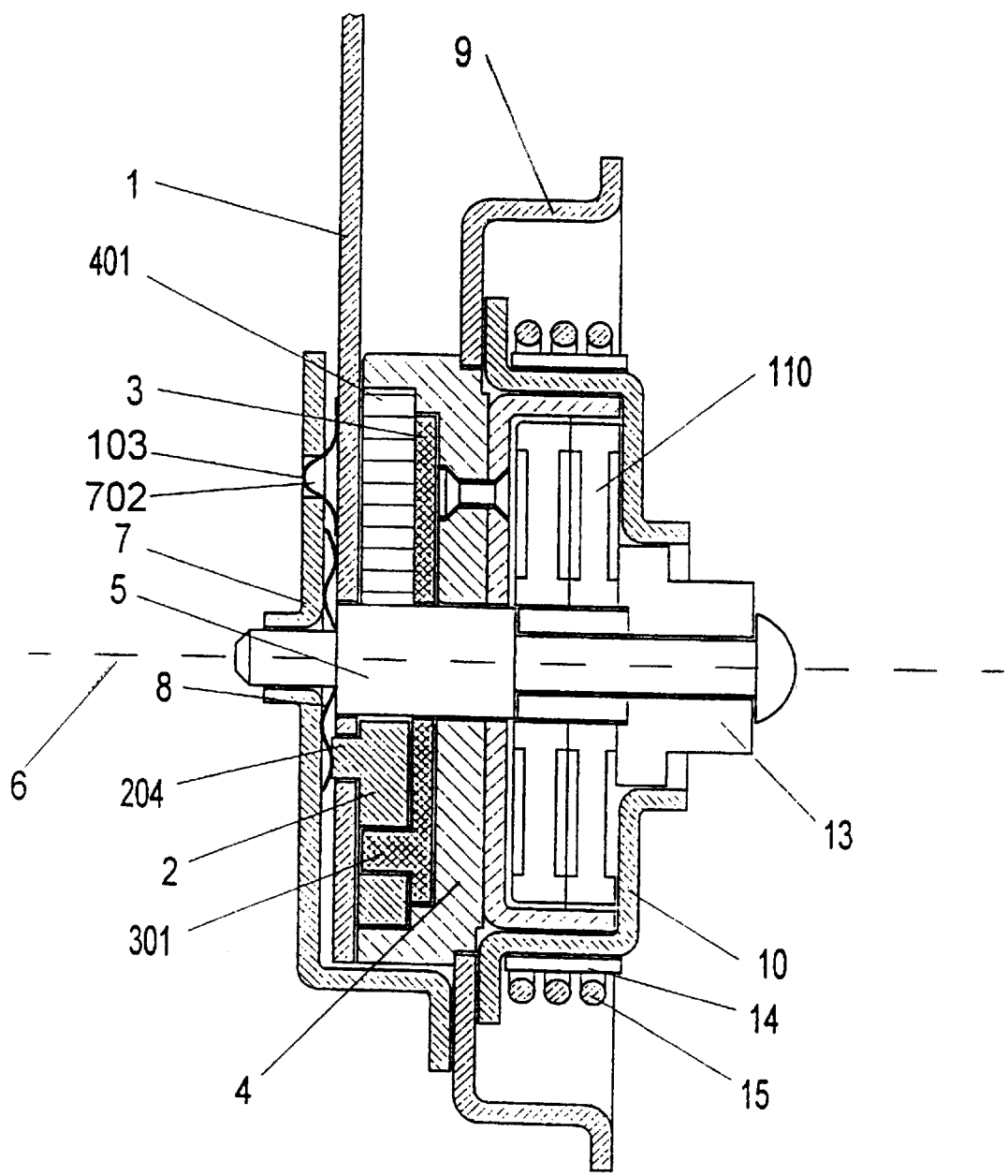
FIG. 8 shows the drive according to FIG. 2 wherein in addition a resilient detent catch is formed on the drive lever.

FIG. 8 shows a further embodiment of an adjustment device which corresponds substantially to the embodiment of FIGS. 1 and 2. A resilient bracket 103 is thereby formed on the drive lever 1 to engage in a detent opening 702 of the cover plate 7 when the drive lever 1 is in the neutral position. A defined neutral position of the drive lever 1 is hereby fixed and an idling of the lever is further minimized at the start of a swivel movement.

The invention is not restricted in its use to the aforementioned embodiments. It is only essential for the invention that a torque transfer to the drive wheel takes place through a locking element which is formed as a swivel tilt element.

What is claimed is:

1. An adjustment drive mechanism having dual-sided action for driving an element, comprising:

a drive lever having a drive axis, a neutral position, a first drive direction and a second drive direction, wherein the drive lever can swivel about the drive axis, wherein the element to be driven is only turned when the drive lever is moved away from the neutral position and the element to be driven is not entrained when the drive lever is moved into the direction of the neutral position;

a drive wheel that is connectable to the element to be driven or represents the same, the drive wheel having a circumference and a plurality of teeth mounted thereon;

a locking means, coupled to the drive lever, having a one-piece tilt element which tilts to and fro between a first end position and a second end position in dependence on the relevant drive direction of the drive lever, wherein in each end position the tilt element locks with the teeth of the drive wheel;

wherein the tilt element is associated with a slide guide which, when the drive lever is activated, guides the tilt element on a defined path and ensures the tilt element is reset when the drive lever is returned to the neutral position without resetting of the drive wheel taking place; and wherein the tilt element has at least two cams arranged symmetrically and guided in the slide guide.

2. The adjustment drive mechanism according to claim 1 wherein the tilt element is mounted to tilt on two radially spaced bearing points.

3. The adjustment drive mechanism according to claim 2 wherein one of the bearing points is formed on a first drive part and the other bearing point is formed on a second drive part, and wherein the bearing points can swivel independently of each other about the drive axis.

4. The adjustment drive mechanism according to claim 3 wherein one of the bearing points is formed on the drive lever and the other bearing point is formed on a holding plate, wherein the drive lever and the holding plate are coupled together by the tilt element.

5. The adjustment drive mechanism according to claim 4 wherein the bearing point formed on the drive lever has a smaller radial distance from the drive axis than the bearing point formed on the holding plate.

6. The adjustment drive mechanism according to claim 4 wherein the holding plate comprises plastic.

7. The adjustment drive mechanism according to claim 4 wherein biasing means are provided which, with a swivel movement of the drive lever out of the neutral position, counteract a corresponding rotation of the holding plate out of its neutral position.

8. The adjustment drive mechanism according to claim 7 wherein the biasing means comprises a rotary spring fixed on the holding plate wherein the rotary spring, during rotation of the holding plate out of the neutral position, exerts a resetting torque on the holding plate in the direction of the neutral position.

9. The adjustment drive mechanism according to claim 7, comprising a detent ball in which the holding plate detachably catches in the neutral position.

10. The adjustment drive mechanism according to claim 7 or 9 wherein the holding plate is coupled to a detent spring which at least when the holding plate is in the neutral position, exerts an axial force on the holding plate and through a braking moment connected therewith counteracts the holding plate turning out of the neutral position.

11. The adjustment drive mechanism according to claim 10 wherein the detent spring exerts an axial force on a stud of the holding plate which to form a bearing engages in a hole of a clamping element.

12. The adjustment drive mechanism according to claim 1 wherein the tilt element is a rocker arm having two toothed areas arranged spaced out on a circular circumference wherein in each end position of the rocker arm one of the toothed areas engages with the teeth of the drive wheel.

13. The adjustment drive mechanism according to claim 12 wherein the toothed areas of the rocker arm and the teeth of the drive wheel are formed flat and have a high coefficient of friction wherein locking of the rocker arm with the drive wheel is produced through friction engagement.

14. The adjustment drive mechanism according to claim 12 wherein the rocker arm is mounted to tilt on two radially spaced bearing points and wherein the rocker arm is constructed axially symmetrical and defines an axis of symmetry, and the two bearing points of the rocker arm lie on the axis of symmetry.

15. The adjustment drive mechanism according to claim 12 wherein the rocker arm is constructed asymmetrical wherein a different stroke is allocated to the two drive directions of the drive lever.

16. The adjustment drive mechanism according to claim 1 wherein the slide guide is formed in a cover plate of the drive which adjoins the drive lever on a drive side.

17. The adjustment drive mechanism according to claim 1 comprising a brake device formed so that a torque transfer on an output side is blocked while a torque transfer on the drive side is possible.

18. The adjustment drive mechanism according to claim 1, comprising a housing and a return spring for returning the drive lever into its neutral position, the return spring coupled on the one hand to a housing stop fixed on the housing and on the other hand to a stop of the drive lever.

19. The adjustment drive mechanism according to claim 18 wherein the return spring is mounted inside the drive wheel.

20. The adjustment drive mechanism according to claim 1 wherein the drive wheel itself forms the element to be driven and wherein the drive wheel transfers a rotary movement produced by the drive mechanism to a driven element mounted on an output side.

21. The adjustment drive mechanism according to claim 1 wherein the element to be driven is a drive shaft to which the drive wheel is rotationally secured whereby the drive wheel transfers a rotary movement produced by the drive to the drive shaft.

22. The adjustment drive mechanism according to claim 1 wherein the tilt element is formed as a sintered part or as a plastic part.

23. The adjustment drive mechanism according to claim 1, wherein the teeth of the drive wheel are internal teeth.

24. An adjustment drive mechanism having dual-sided action for driving an element, comprising:

a drive lever having a drive axis, a neutral position, a first drive direction and a second drive direction, wherein the drive lever can swivel about the drive axis, wherein the element to be driven is only turned when the drive lever is moved away from the neutral position and the element to be driven is not entrained when the drive lever is moved into the direction of the neutral position;

a drive wheel that is connectable to the element to be driven or represents the same, the drive wheel having a circumference and a plurality of teeth mounted thereon;

a locking means, coupled to the drive lever, having a one-piece tilt element which tilts to and fro between a first end position and a second end position in dependence on the relevant drive direction of the drive lever, wherein in each end position the tilt element locks with the teeth of the drive wheel;

wherein the tilt element is a rocker arm having two toothed areas arranged spaced out on a circular circumference wherein in each end position of the rocker arm one of the toothed areas engages with the teeth of the drive wheel; and wherein the toothed areas of the rocker arm and the teeth of the drive wheel are formed flat and have a high coefficient of friction wherein locking of the rocker arm with the drive wheel is produced through friction engagement.

25. An adjustment drive mechanism having dual-sided action for driving an element, comprising:

a drive lever having a drive axis, a neutral position, a first drive direction and a second drive direction, wherein the drive lever can swivel about the drive axis, wherein the element to be driven is only turned when the drive lever is moved away from the neutral position and the element to be driven is not entrained when the drive lever is moved into the direction of the neutral position;

a drive wheel that is connectable to the element to be driven or represents the same, the drive wheel having a circumference and a plurality of teeth mounted thereon;

a locking means, coupled to the drive lever, having a one-piece tilt element which tilts to and fro between a first end position and a second end position in dependence on the relevant drive direction of the drive lever, wherein in each end position the tilt element locks with the teeth of the drive wheel;

wherein the tilt element is a rocker arm having two toothed areas arranged spaced out on a circular circumference wherein in each end position of the rocker arm one of the toothed areas engages with the teeth of the drive wheel; and wherein the rocker arm is constructed asymmetrical wherein a different stroke is allocated to the two drive directions of the drive lever.

26. An adjustment drive mechanism having dual-sided action for driving an element, comprising:

a drive lever having a drive axis, a neutral position, a first drive direction and a second drive direction, wherein the drive lever can swivel about the drive axis, wherein the element to be driven is only turned when the drive lever is moved away from the neutral position and the element to be driven is not entrained when the drive lever is moved into the direction of the neutral position;

a drive wheel that is connectable to the element to be driven or represents the same, the drive wheel having a circumference and a plurality of teeth mounted thereon;

a locking means, coupled to the drive lever, having a one-piece tilt element which tilts to and fro between a first end position and a second end position in dependence on the relevant drive direction of the drive lever, wherein in each end position the tilt element locks with the teeth of the drive wheel; and a holding plate and a detent ball in which the holding plate detachably catches in the neutral position;

wherein the tilt element is mounted to tilt on two radially spaced bearing points, one of the bearing points is formed on a first drive part and the other bearing point is formed on a second drive part, and wherein the bearing points can swivel independently of each other about the drive axis;

wherein one of the bearing points is formed on the drive lever and the other bearing point is formed on the holding plate; wherein the drive lever and the holding plate are coupled together by the tilt element; and wherein biasing means are provided which, with a swivel movement of the drive lever out of the neutral position, counteract a corresponding rotation of the holding plate out of its neutral position.

27. The adjustment drive mechanism of claim according to claim 26 wherein the holding plate is coupled to a detent spring which at least when the holding plate is in the neutral position, exerts an axial force on the holding plate and through a braking moment connected therewith counteracts the holding plate turning out of the neutral position.

28. An adjustment drive mechanism having dual-sided action for driving an element, comprising:

a drive lever having a drive axis, a neutral position, a first drive direction and a second drive direction, wherein the drive lever can swivel about the drive axis, wherein the element to be driven is only turned when the drive lever is moved away from the neutral position and the element to be driven is not entrained when the drive lever is moved into the direction of the neutral position;

a drive wheel that is connectable to the element to be driven or represents the same, the drive wheel having a circumference and a plurality of teeth mounted thereon;

a locking means, coupled to the drive lever, having a one-piece tilt element which tilts to and fro between a first end position and a second end position in dependence on the relevant drive direction of the drive lever, wherein in each end position the tilt element locks with the teeth of the drive wheel;

wherein the tilt element is mounted to tilt on two radially spaced bearing points, one of the bearing points is formed on a first drive part and the other bearing point is formed on a second drive part, and wherein the bearing points can swivel independently of each other about the drive axis;

wherein one of the bearing points is formed on the drive lever and the other bearing point is formed on a holding plate; wherein the drive lever and the holding plate are coupled together by the tilt element;

wherein biasing means are provided which, with a swivel movement of the drive lever out of the neutral position, counteract a corresponding rotation of the holding plate out of its neutral position; and wherein the holding plate is coupled to a detent spring which at least when the holding plate is in the neutral position, exerts an axial force on the holding plate and through a braking moment connected therewith counteracts the holding plate turning out of the neutral position.

29. The adjustment drive mechanism of claim 27 or 28 wherein the detent spring exerts an axial force on a stud of the holding plate which to form a bearing engages in a hole of a clamping element.

30. An adjustment drive mechanism having dual-sided action for driving an element, comprising:
- a drive lever having a drive axis, a neutral position, a first drive direction and a second drive direction, wherein the drive lever can swivel about the drive axis, wherein the element to be driven is only turned when the drive lever is moved away from the neutral position and the element to be driven is not entrained when the drive lever is moved into the direction of the neutral position;
- a drive wheel that is connectable to the element to be driven or represents the same, the drive wheel having a circumference and a plurality of teeth mounted thereon;
- a locking means, coupled to the drive lever, having
- a one-piece tilt element which tilts to and fro between a first end position and a second end position in dependence on the relevant drive direction of the drive lever, wherein in each end position the tilt element locks with the teeth of the drive wheel; and
- a housing and a return spring for returning the drive lever into its neutral position, the return spring coupled on the one hand to a housing stop fixed on the housing and on the other hand to a stop of the drive lever.

31. The adjustment drive mechanism according to claim 30 wherein the return spring is mounted inside the drive wheel.

32. An adjustment drive mechanism having dual-sided action for driving an element, comprising:
- a drive lever having a drive axis, a neutral position, a first drive direction and a second drive direction, wherein the drive lever can swivel about the drive axis, wherein the element to be driven is only turned when the drive lever is moved away from the neutral position and the element to be driven is not entrained when the drive lever is moved into the direction of the neutral position;
- a drive wheel that is connectable to the element to be driven or represents the same, the drive wheel having a circumference and a plurality of teeth mounted thereon;
- a locking means, coupled to the drive lever, having
- a one-piece tilt element which tilts to and fro between a first end position and a second end position in dependence on the relevant drive direction of the drive lever, wherein in each end position the tilt element locks with the teeth of the drive wheel;
- wherein the tilt element is formed as a sintered part or as a plastic part.

33. An adjustment drive mechanism having dual-sided action for driving an element, comprising:
- a drive lever having a drive axis, a neutral position, a first drive direction and a second drive direction, wherein the drive lever can swivel about the drive axis, wherein the element to be driven is only turned when the drive lever is moved away from the neutral position and the element to be driven is not entrained when the drive lever is moved into the direction of the neutral position;
- a drive wheel that is connectable to the element to be driven or represents the same, the drive wheel having a circumference and a plurality of teeth mounted thereon;
- a locking means, coupled to the drive lever, having
- a one-piece tilt element which tilts to and fro between a first end position and a second end position in dependence on the relevant drive direction of the drive lever, wherein in each end position the tilt element locks with the teeth of the drive wheel;
- wherein the tilt element is mounted to tilt on two radially spaced bearing points;
- wherein one of the bearing points is formed on a first drive part and the other bearing point is formed on a second drive part, and wherein the bearing points can swivel independently of each other about the drive axis;
- wherein one of the bearing points is formed on the drive lever and the other bearing point is formed on a holding plate, wherein the drive lever and the holding plate are coupled together by the tilt element; and
- wherein the holding plate comprises plastic.

* * * * *